United States Patent
Smith

(10) Patent No.: US 8,141,480 B2
(45) Date of Patent: Mar. 27, 2012

(54) AUTOMATIC BALE SIZE CALIBRATION ON ROUND BALERS

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 30 days.

(21) Appl. No.: 12/861,748

(22) Filed: Aug. 23, 2010

(65) Prior Publication Data

US 2012/0042792 A1 Feb. 23, 2012

(51) Int. Cl.
- *B30B 5/04* (2006.01)
- *B65B 11/04* (2006.01)
- *B65B 57/04* (2006.01)

(52) U.S. Cl. .......... 100/88; 100/4; 100/35; 56/341; 53/399; 53/64; 53/504; 53/507; 53/587

(58) Field of Classification Search .......... 100/2, 4, 100/5, 13, 15, 35, 87, 88; 56/341; 53/52, 53/64, 118, 204, 211, 503, 504, 507, 587, 53/399

See application file for complete search history.

(56) References Cited

U.S. PATENT DOCUMENTS

| | | | |
|---|---|---|---|
| 4,686,820 A * | 8/1987 | Andra et al. | 56/341 |
| 4,855,924 A | 8/1989 | Strosser et al. | |
| 4,998,961 A | 3/1991 | Anderson et al. | |
| 5,551,218 A * | 9/1996 | Henderson et al. | 53/504 |
| 5,631,826 A * | 5/1997 | Chow | 700/84 |
| 5,855,166 A | 1/1999 | McPherson | |
| 6,318,250 B1 | 11/2001 | Arnould et al. | |
| 6,571,531 B2 | 6/2003 | Kasel | |
| 6,966,162 B2 | 11/2005 | Viaud et al. | |
| 7,295,895 B2 | 11/2007 | Smith et al. | |
| 7,437,866 B2 * | 10/2008 | Smith et al. | 56/341 |
| 7,448,316 B2 | 11/2008 | Posselius | |

FOREIGN PATENT DOCUMENTS

| | | |
|---|---|---|
| DE | 10011158 A1 | 9/2001 |
| EP | 1502496 A1 | 2/2005 |
| FR | 2811654 A1 | 1/2002 |

* cited by examiner

*Primary Examiner* — Jimmy T Nguyen
(74) *Attorney, Agent, or Firm* — Patrick M. Sheldrake

(57) ABSTRACT

A method and apparatus for automatically calibrating a bale size indicator by using inputs from existing bale wrapper material monitors to determine the linear amount of wrapping material necessary to encircle the bale one time. Balers with wrapping mechanisms may include a sensor for measuring the linear amount of wrapper dispensed as a means to alert the operator when the supply of wrapper material is low. Such balers may also have additional sensors for verifying that wrapping material completely encircles the bale prior to allowing the bale to be ejected from the baler. Using inputs from each of these sensors, a control system on the baler can determine the amount of wrapping material necessary to cover one revolution of the bale, also an indication of the bale circumference, and use the measurement to calibrate the display of bale diameter also generated from the control system. The automated capability eliminates the need for an operator to manually measure the diameter of a completed bale and enter that measurement into the indicator control system.

13 Claims, 4 Drawing Sheets

AUTOMATIC BALE SIZE CALIBRATION ON ROUND BALERS

BACKGROUND OF THE INVENTION

The present invention relates generally to agricultural balers and more particularly to a method and apparatus for calibrating the bale size indicator on a round baler.

Round balers have become quite prevalent for their capability of producing a conveniently sized cylindrical bale and very often include a mechanism to wrap the bale before it is ejected from the machine. Such round balers generally have a bale-forming chamber defined by an array of side-by-side belts, transverse slats trained on chains, a plurality of rolls or a combination of these various elements, e.g., rolls and belts. Crop material, such as hay, is picked up from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling.

Continuous pressures to increase operational efficiency and ease of operation in round balers have resulted in increased levels of automation. Sensors monitoring bale chamber configuration (size) and wrapper usage are common. One automation area of interest involves monitoring of the size and shape of the bale in the bale-forming in order to initiate wrapping and bale ejection operations or alert the operator to take such actions. Currently, new balers or balers having just been serviced must have bale size indicators calibrated by manual means. This process typically involving measuring the diameter of a bale formed in the in the chamber after ejection. The bale diameter is used to correlate the measured bale diameter with the sensed bale diameter, typically in a sensor control or interface apparatus.

It would be desirable to provide an apparatus and a method for automatically calibrating the bale size indicator in a round baler which eliminates the need to manually measure the diameter of a completed bale after ejection and then manually entering that measurement into the size indicator apparatus. Additional advantages would be realized by an apparatus capable of using sensors and monitoring devices already existing on the baler in order to perform the calibration operation.

SUMMARY OF THE INVENTION

Accordingly, the present invention, in any of the embodiments described herein, may provide one or more of the following advantages:

It is an object of the present invention to provide an apparatus and a method for automatically calibrating the bale size indicator on a round baler.

It is a further object of the present invention to provide an apparatus for calibrating the bale size indicator on a round baler that uses existing sensing features on the baler.

It is a further object of the present invention to provide an apparatus for calibrating the bale size indicator on a round baler using measurements of the wrapping material used to encircle the bale.

It is a further object of the present invention to provide an apparatus for calibrating the bale size indicator on a round baler that will work in conjunction with known baler wrapper monitoring devices without adversely affecting functionality of the wrapper monitoring devices.

It is a still further object of the present invention to provide an method and apparatus for automatically calibrating the bale size indicator on a round baler that is durable in construction, inexpensive of manufacture, carefree of maintenance, easily assembled, and simple and effective to use.

These and other objects are achieved according to the instant invention by providing a method and apparatus for automatically calibrating a bale size indicator by using inputs from existing bale wrapper material monitors to determine the linear amount of wrapping material necessary to encircle the bale one time. Balers with wrapping mechanisms may include a sensor for measuring the linear amount of wrapping material dispensed as a means to alert the operator when the supply of wrapping material is low. Such balers may also have additional sensors for verifying that wrapping material completely encircles the bale prior to allowing the bale to be ejected from the baler. Using inputs from each of these sensors, a control system on the baler can determine the amount of wrapping material necessary to cover one revolution of the bale, also an indication of the bale circumference, and use the measurement to calibrate the display of bale diameter also generated from the control system. The automated capability eliminates the need for an operator to manually measure the diameter of a completed bale and enter that measurement into the indicator control system.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
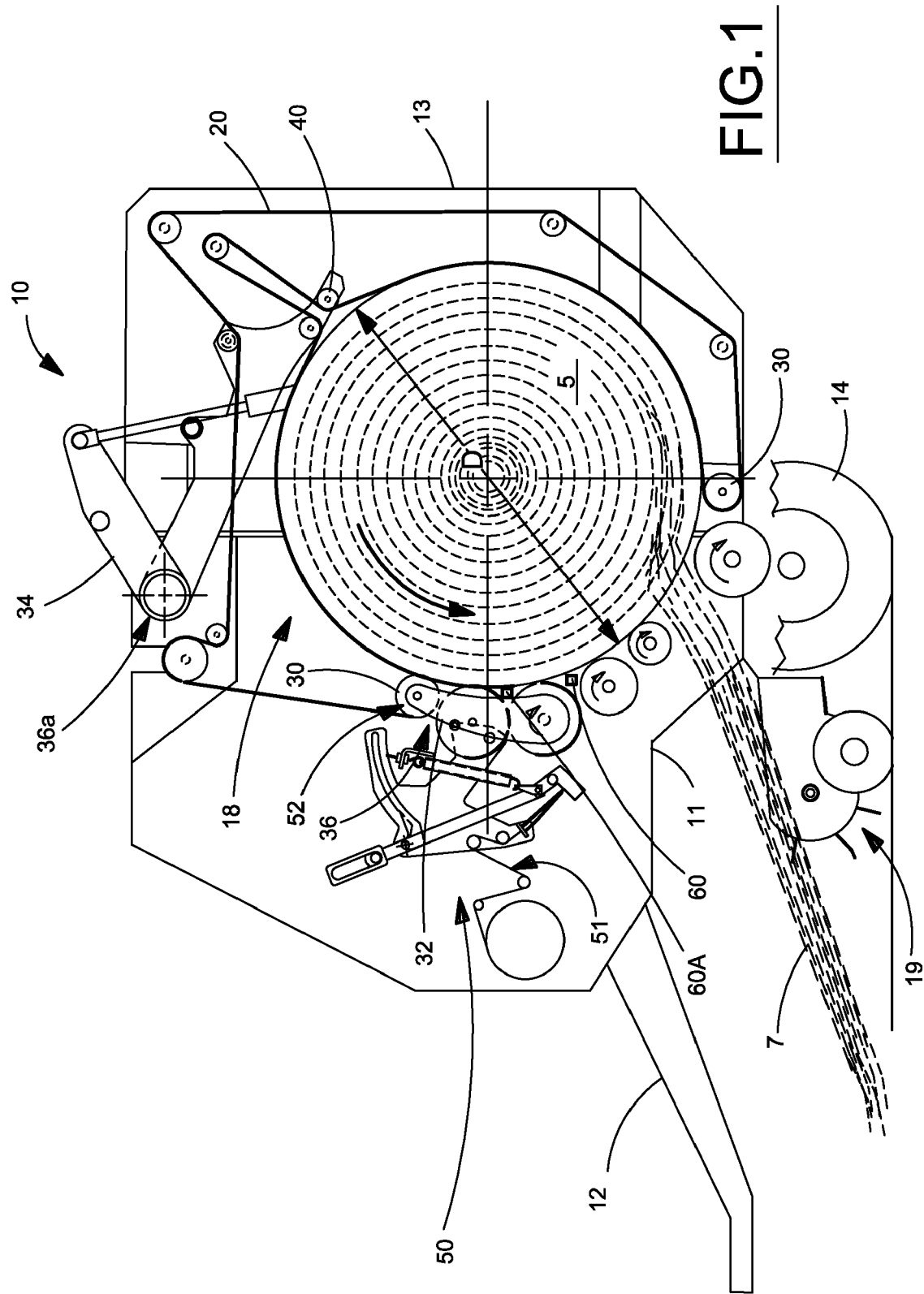
FIG. 1 is a side view of a typical agricultural round baler on which the present invention is useful showing a bale forming chamber configured as it would be near the end of a bale forming cycle.
Figure 2:
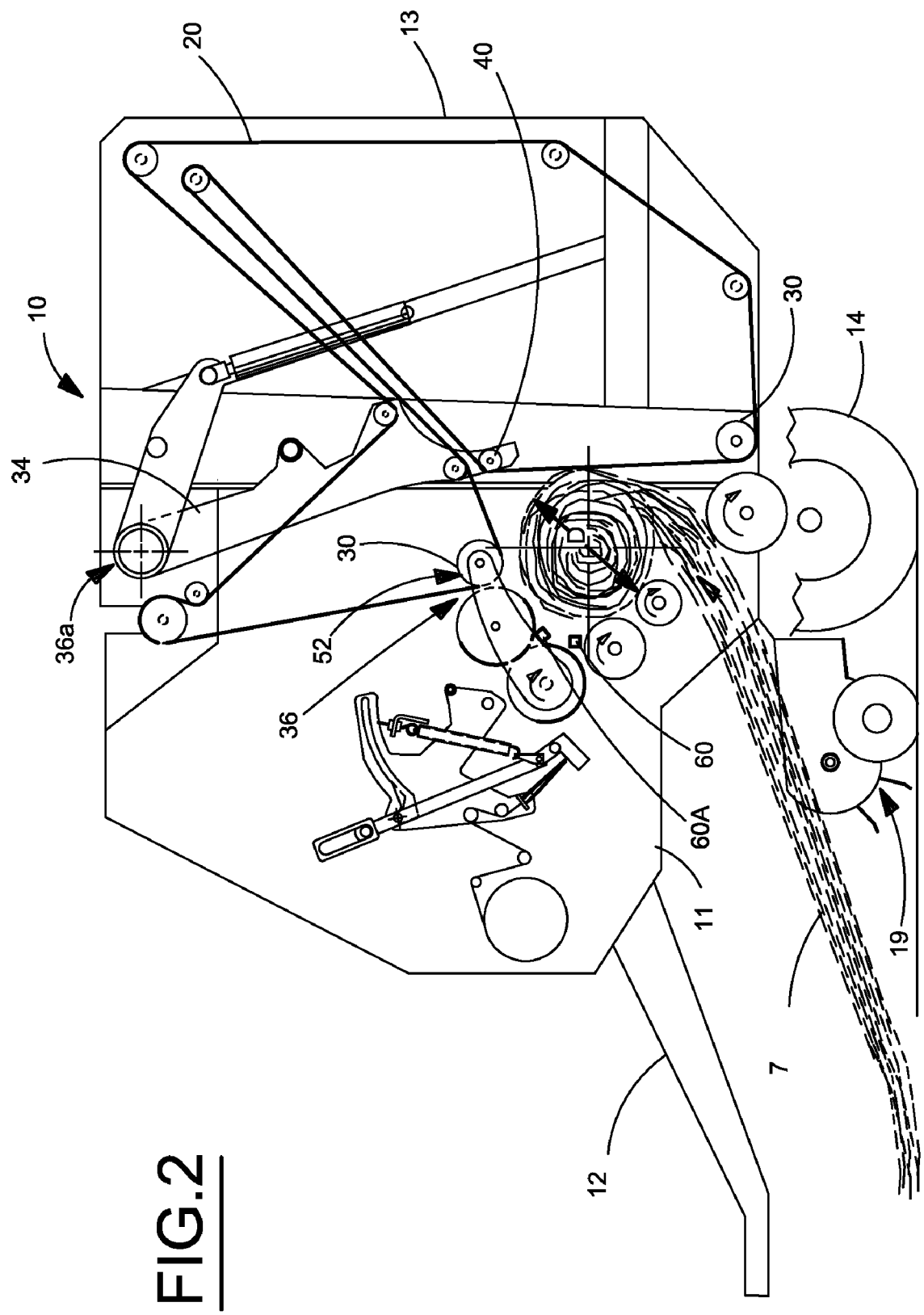
FIG. 2 is a side view of the agricultural round baler in FIG. 1 in which the bale forming chamber is configured as it would be near the beginning of a bale forming cycle.
Figure 3:
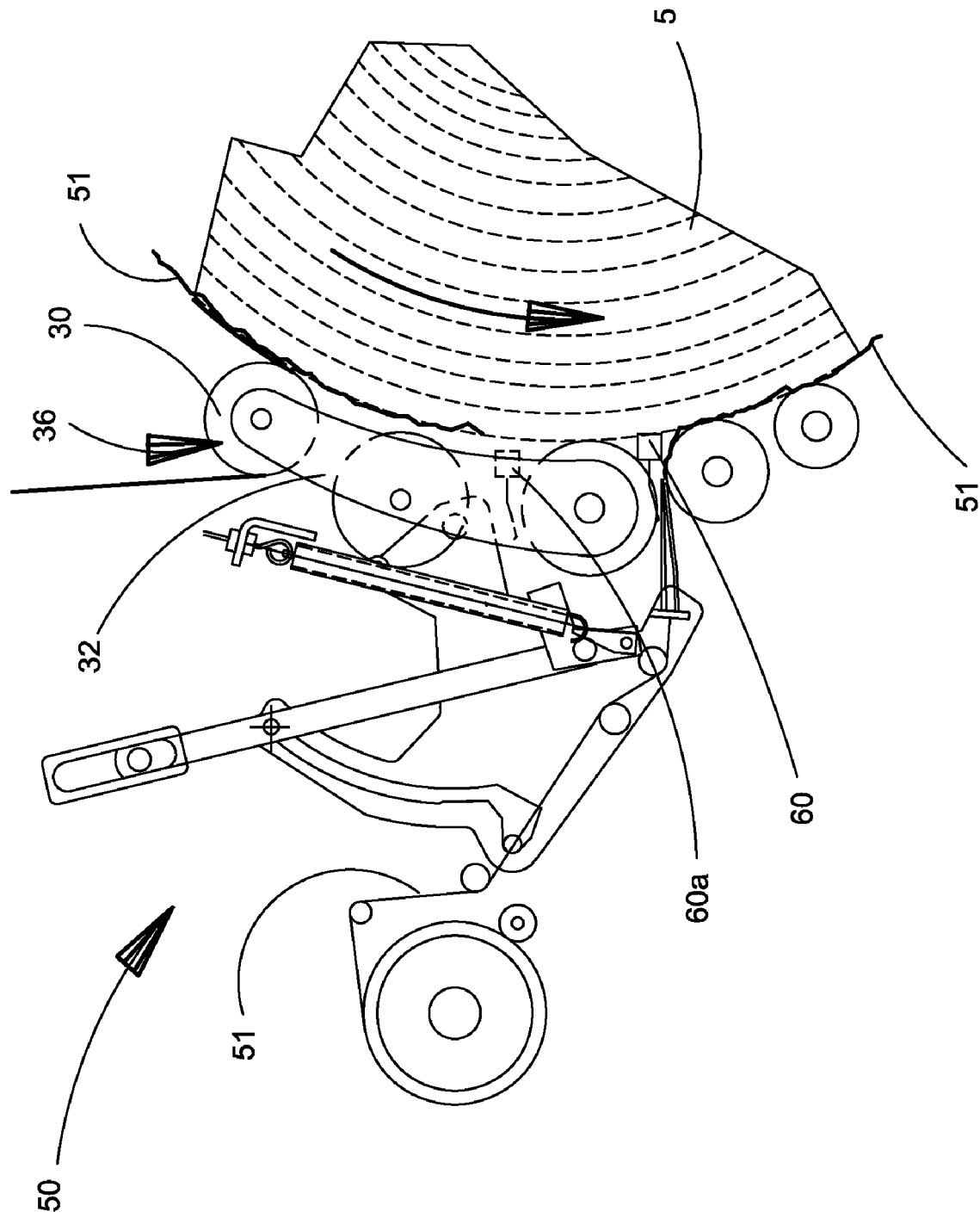
FIG. 3 is a partial view of the baler of FIG. 1 showing the bale wrapping mechanism.

Round balers are well known in agriculture. Reference is made to U.S. Pat. Nos. 4,870,812, 5,367,865, and 6,170,246, the descriptive portions of which are incorporated herein by reference to illustrate the common features of round balers. Referring to FIGS. 1 and 2, a generally well-known round baler 10 is shown to comprise a main frame 11 terminating forwardly in a tongue 12 and rearwardly, slightly beyond a transverse axle to which a pair of wheels 14 (only one shown) are mounted, thus forming a wheel supported main frame. The main frame 11 supports a series of movable belts 20, transversely arranged fixed rolls 30, and belt guide rolls 40 which together with a pair of generally parallel and opposing sidewalls establish an expandable bale-forming chamber 18. Cut crop material 7 is picked up by transverse pickup 19 and fed into bale-forming chamber 18 where it is formed into a cylindrically shaped bale 5 of a desired diameter by movement of the belts 20 and rolls 30. A wrapping mechanism 50 surrounds the completed bale 5 with a wrapping material to maintain the bale shape after ejection from the baler. Upon completion of the wrapping process, the tailgate 13 pivots upwardly to open the rearward portion of the bale forming chamber 18 and the bale 5 is ejected onto the ground.

Figure 4:
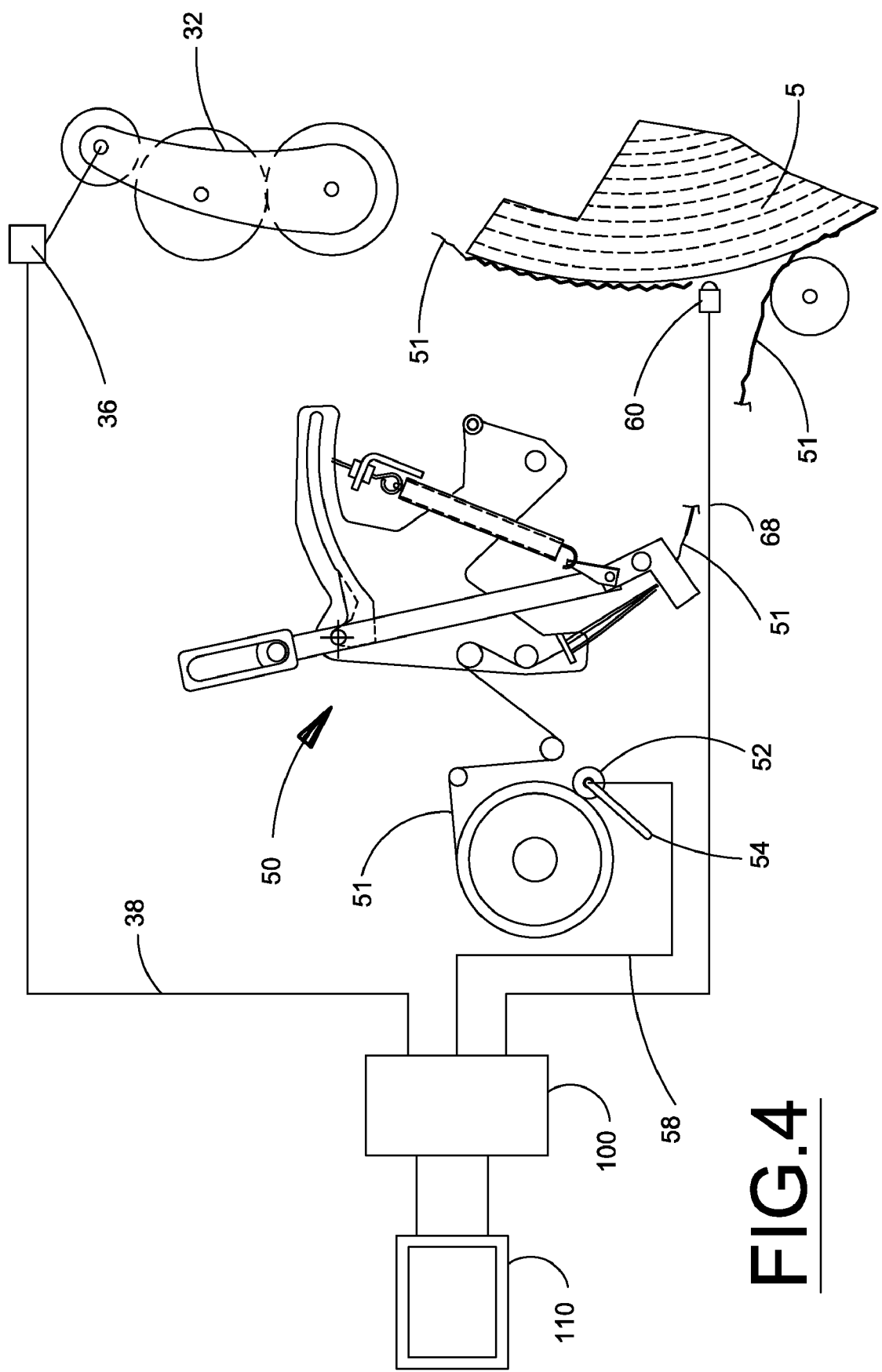
FIG. 4 shows a schematic diagram of a system for monitoring the infeed of wrapping material as a means for automatically calibrating a bale size indicator.

Many aspects of the baling process are monitored in order to provide feedback to the operator or to automate aspects of the baling process. Feedback may be provided using simple indicators disposed on the baler itself or on a visual display screen commonly provided with more complex digital control and monitoring systems. One parameter commonly monitored is the diameter of the bale forming inside the bale chamber, illustrated as dimension "D" in FIGS. 1 and 2. A system for monitoring bale diameter allows the operator to be alerted to stop and initiate the wrapping process when a desired bale size is reached. Bale size may be determined by monitoring the position of the sledge 32 or the belt take-up roller mechanism 34 and displayed on an indicator for the operator. A position sensor 36 on the sledge (or 36a on the belt take-up mechanism) generates a position signal 38 (see FIG. 4) indicative of the bale size. The actual bale size with respect to the sledge or take-up roller position may vary over the life of the machine due to stretching, repair, or replacement of the movable belts. Accordingly, it is necessary for the bale size position sensor to be periodically calibrated during the life of the baler. Calibrating the bale size indicator requires information on the size of the bale for a given position of the sledge 32 or take-up roller mechanism 34.

It is known to equip round balers with a device for measuring the lineal amount of wrapping material 51 dispensed from the wrapper mechanism 50 in order to alert the operator when the wrapper supply is low and to insure the correct amount of wrap was applied to each bale. U.S. Pat. No. 7,295,895 discloses one such method and apparatus for measuring the lineal amount of wrapping material supply used. One embodiment of the apparatus comprises a measuring wheel place in contact with the outer surface of the wrapping material on a supply roll such that the measuring wheel rotates as the wrapping material is fed from the roll. Rotation of the measuring wheel is converted into a signal indicative of the length of wrapping material dispensed from the supply roll. It is also known to provide a device for sensing the presence of wrapper material on the outer periphery of the bale as part of an apparatus for confirming that a bale has been completely wrapped. U.S. Pat. No. 7,448,316 discloses an optical sensor array 60 positioned adjacent to the bale chamber, radially adjacent to the bale where it is capable of detecting the presence of wrapping material on the bale based on changes in reflectance of the outward surface of the bale. By positioning this sensor array just upstream (based on the direction of rotation of the bale in the chamber) adjacent to the location at which wrapping material is introduced into the bale chamber, the optical sensor array can detect the presence of wrapping material on the cylindrical surface of the bale just as one complete revolution of the bale is completed (i.e., the first layer of wrapping material is applied to the bale cylindrical surface). In one embodiment, the optical sensor array comprises an array of transmitting and receiving LEDs. These patents are incorporated herein by reference.

Now referring to FIGS. 1 through 4 collectively, the present invention is shown to take the output signal 58 of the wrapper lineal measuring device 52 and the output signal 68 from optical sensor array 60 indicating that the wrapper material 51 is present on the peripheral surface of the bale 5 and determine the linear measure of wrapping material necessary to encircle the bale 5 one time. The signals are communicated to a processor 100 which monitors the output signal from the measuring device 52 from the time the wrapping mechanism is activated until the optical sensor 60 detects the presence of wrapper material on the bale surface. Processor 100 is preferably a microprocessor capable of accepting program instructions and performing computations using such instructions and inputs from various sensors. The optical sensor 60 is preferably positioned adjacent to the point at which the wrapper material 51 is introduced into the bale chamber and slightly upstream (in the direction of bale rolling in the chamber), shown as sensor 60. The optical sensor array 60 in this location is preferably connected to the baler frame. The sensor may be alternatively displaced from the wrapper material insertion point, shown in the figures as sensor location 60a which could be connected to the sledge 32. The processor 100 can be programmed to adjust the bale diameter measurement to adjust the bale diameter reading in consideration of the optical sensor displacement from the preferred location and the rate at which wrapper material is being fed into the bale chamber. The length of wrapper material supplied for the first revolution of the bale 5 is generally equal to the bale circumference. Processor 100 can easily determine bale diameter from circumference and then use the measured diameter to calibrate the bale diameter display on operator display console 110. This calibration process can be performed each time a completed bale is wrapped or only when necessary, such as for new machines or following maintenance service on the machine.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a round baler having a wheel-supported main frame having a front end and an opposing rear end and adapted for movement in a direction of travel through a field of cut crop material, a bale-forming chamber supported on said main frame and including a plurality of belts and rollers arranged to form a cylindrical bale by rotation of crop material within the bale-forming chamber, a pickup mounted to the forward end of said main frame and adapted to pick up crop material from the field and feed it into the bale-forming chamber, a tailgate pivotably affixed to the bale-forming chamber and adapted to pivot vertically between a closed position where a bale is captured in the bale-forming chamber and an open position where the bale can be ejected, and a wrapping material dispensing mechanism affixed to the main frame and located peripheral to the bale-forming chamber and onto the cylindrical surface of the formed bale in the chamber, the improvement comprising:
  an array of first sensors supported on said baler and located in a position to sense the reflectance of the cylindrical surface of the formed bale in the bale-forming chamber and initiate a first output signal;
  a second sensor supported on said baler and located in a position to measure a quantity of wrapping material dispensed from the dispensing mechanism and to initiate a second output signal representative thereof;
  a bale size indicator; and
  a controller configured to receive said first output signal and said second output signal, determine the length of wrapping material dispensed from the dispenser from initiation of bale wrapping dispensing until said array of first sensors sense a change in reflectance caused by the presence of said wrapping material on said cylindrical surface of the bale, determining a measured bale size using said length, and calibrating said bale size indicator using said measured bale size.

2. The improvement of claim 1, further comprising a bale size sensor configured to monitor the bale chamber size and provide a bale size signal to said controller for output to said bale size indicator.

3. The improvement of claim 2, wherein said controller is a programmable digital processor.

4. The improvement of claim 3, wherein said bale size indicator is a visual display managed by said controller.

5. The improvement of claim 4, wherein said array of first sensors is positioned radially adjacent to the bale, and rotationally upstream on the bale of the wrapping material entry into the bale forming chamber.

6. The improvement of claim 5, wherein said second sensor is a measuring wheel in contact with the wrapping material.

7. The improvement of claim 6, wherein said first sensors are optical sensors.

8. A method for calibrating a bale size indicator on a round baler, the baler having a bale-forming chamber arranged to form a cylindrical bale therein, and a wrapping material dispensing mechanism located peripheral to the bale-forming chamber and configured to selectively supply wrapping material into the bale forming chamber to encircle the bale, the method comprising the steps of:
  providing a first sensor supported on said round baler and located in a position to measure a quantity of wrapping material dispensed from the dispensing mechanism and to initiate a first output signal representative thereof;
  providing an array of second sensors supported on said round baler and located in a position to sense the reflectance of the cylindrical surface of the formed bale in the bale-forming chamber and initiate a second output signal;
  providing a bale size indicator;
  providing a controller configured to receive the first output signal and the second output signal;
  initiating a bale wrapping sequence wherein wrapping material is dispensed and the first sensor begins measuring the length of wrapping material dispensed;
  receiving by the controller, the second output signal indicating the bale has been covered by one layer of wrapping material;
  determining by the controller from the first output signal, the length of wrapping material dispensed from the initiation of the wrapping sequence until receipt of the second output signal;
  determining by the controller, the size of the bale in the bale forming chamber; and
  calibrating the bale size indicator using the size of the bale.

9. The method of claim 8, further comprising the steps:
  providing a bale size sensor configured to determine the bale chamber size and provide a representative bale size signal to the controller; and
  providing by the controller, a signal indicative of the bale size to the bale size indicator.

10. The method of claim 8, wherein said controller is a programmable digital processor.

11. The method of claim 10, further comprising the step of:
  programming the controller to calibrate the bale size indicator at pre-determined points in the baling operation.

12. The method of claim 8, wherein the array of first sensors is positioned radially adjacent to the bale, and rotationally upstream on the bale of the wrapping material entry into the bale forming chamber.

13. The method of claim 12, wherein the array of first sensors is an array of optical sensors.

* * * * *